(12) United States Patent
Young

(10) Patent No.: US 7,161,721 B2
(45) Date of Patent: Jan. 9, 2007

(54) COMPUTER GENERATED HOLOGRAMS

(75) Inventor: Robert Ian Young, Malvern (GB)

(73) Assignee: Qinetiq Limited (GB)

( * ) Notice: Subject to any disclaimer, the term of this patent is extended or adjusted under 35 U.S.C. 154(b) by 30 days.

(21) Appl. No.: 10/504,205

(22) PCT Filed: Feb. 18, 2003

(86) PCT No.: PCT/GB03/00762

§ 371 (c)(1),
(2), (4) Date: Aug. 11, 2004

(87) PCT Pub. No.: WO03/071360

PCT Pub. Date: Aug. 28, 2003

(65) Prior Publication Data

US 2005/0088712 A1  Apr. 28, 2005

(30) Foreign Application Priority Data

Feb. 23, 2002 (GB) ............................. 0204314.9

(51) Int. Cl.
*G03H 1/08* (2006.01)
(52) U.S. Cl. ............................... 359/9; 359/29
(58) Field of Classification Search ............ 359/9, 359/29
See application file for complete search history.

(56) References Cited

U.S. PATENT DOCUMENTS 6,275,310 B1  8/2001  Cohn 6,456,405 B1 *  9/2002  Horikoshi et al. ............ 359/9

OTHER PUBLICATIONS

Hauck R., "Computer Generated Holograms with Pulse-Density Modulation", Journal of Optical Society of America, pp. 5-10 (1984).
Ferri L.C., "Visualization of 3D Information with Digital Holography Using Laser Printers", Computers and Graphics,. pp. 309-321 (2001).
Legeard et al., "Etude comparative des differentes methodes de codage binaire pour hologrammes synthetises par ordinateur" ESI Proceedings, pp. 149-158 (1992).

* cited by examiner

*Primary Examiner*—Alessandro Amari
(74) *Attorney, Agent, or Firm*—McDonnell Boehnen; Hulbert & Berghoff LLP

(57) ABSTRACT

A method of generating a binary computer generated hologram for use in displaying a holographic image, the method comprising the steps of generating a complex modulation computer generated hologram corresponding to a desired reply object, transforming the complex modulation computer generated hologram into a real positive computer generated hologram, and transforming the real positive computer generated hologram into a binary computer generated hologram by comparing each element of the real positive computer generated hologram with at least one neighboring element and replacing the compared element with a binary value which depends upon the result of the comparison.

7 Claims, 2 Drawing Sheets

---

Generate fully complex CGH for replay object within a signal plane

↓

Generate real positive CGH array by taking real parts of complex elements

↓

Determine line of symmetry in replay plane

↓

Binarise real positive CGH array by neighbour comparison along lines parallel to line of symmetry

| Generate fully complex CGH for replay object within a signal plane |

↓

| Generate real positive CGH array by taking real parts of complex elements |

↓

| Determine line of symmetry in replay plane |

↓

| Binarise real positive CGH array by neighbour comparison along lines parallel to line of symmetry |

COMPUTER GENERATED HOLOGRAMS

BACKGROUND OF THE INVENTION (1) Field of the Invention

The present invention relates to a method of generating computer generated holograms.

(2) Description of the Art

It is well known that a three-dimensional image may be presented by forming an interference pattern or hologram on a planer surface. The three-dimensional image is visible when the hologram is appropriately illuminated. Recently, interest has grown in so-called computer generated holograms (CGHs) which offer the possibility of displaying high quality images, which need not be based upon real objects, with appropriate depth cues and without the need for viewing goggles. Interest is perhaps most intense in the medical and design fields where the need for realistic visualisation techniques is great.

Typically, a computer generated hologram involves the generation of a matrix of data values (each data value corresponding to a light transmission level) which simulates the hologram which might otherwise be formed on a real planer surface. The matrix is applied to some medium suitable for displaying the CGH such as a Spatial Light Modulator (SLM) which may be, for example, a two-dimensional array of liquid crystal elements or of acousto-optic modulators. Coherent light is directed onto the SLM using for example a laser such that the resulting output, either reflected from the SLM or transmitted through the SLM, is a modulated light pattern. An example of an SLM is an Electrically Addressable SLM (EASLM).

FIG. 1 illustrates a system for producing a holographic image using a CGH. Light from a point source 1 is collimated by optics 2 and directed towards a beamsplitter 3. Light is reflected by the beamsplitter 3 onto the surface of a spatial light modulator (SLM) 4 which is used to display the CGH. Replay optics 5, 6 direct light reflected from the SLM 4 to an image region where the image 7 is displayed. A so-called conjugate image 8 also appears in this region. In this arrangement, the SLM 4 may be an optically addressed SLM or an electrically addressed SLM.

An ideal CGH has complex light modulation, where 'complex' is referring to complex numbers (with real and imaginary parts) which can be used to describe both the amplitude and phase of the light. In principle, such a CGH would be capable of replaying a perfect image. Previously reported algorithms capable of designing such a CGH include the Coherent Ray Trace (CRT), the Ping-pong method and the Diffraction Specific (DS) method. CRT and the Ping-pong method involve propagating light reflected from a simulated 3D object to a CGH plane. The amplitude and phase of the wavefront at the CGH plane is then used to determine the CGH pixel transmission values. CRT makes use of ray tracing to calculate the propagation of the wavefront whilst the Ping-pong method makes use of Fourier transforms. The DS method is different in that it makes use of pre-computed look-up tables to determine the CGH pixel transmission values that will enable a particular 3D image to be displayed.

It is very difficult to obtain fully complex SLMs. SLMs suitable for the display of CGHs typically have constrained light modulation abilities. For example they may only be able to modulate the amplitude of light or only its phase. It is particularly desirable to be able to display CGHs on SLMs with only binary modulation (each pixel having only an on or off state) as these are relatively simple to fabricate. Constraining the light modulation values of the CGH so that it may be displayed on such SLMs generally results in an increase in noise in the replayed image. An intuitive explanation for this is that constrained modulation CGHs contain less 'information'.

Algorithms exist that enable constrained modulation CGHs to be designed that replay images either with reduced noise or where the location of the noise can be controlled, e.g. shifted away from the target image. For example, Projection Onto Constraint Sets (POCS) and Direct Binary Search (DBS) can be used to generate a suitably constrained CGH. These algorithms rely upon the use of a "target image" in order to design the final CGH, and try to minimise the errors resulting from a mapping of a continuous set of transmission value pixels to a corresponding binary set. The hologram is optimised so that it results in the replay of an image as close as possible to the target image (some form of merit function is used to measure the quality/fidelity of the replay). This process places an additional heavy load on the available computer processing power, particularly as binarising algorithms which produce low noise results tend to be iterative.

The 'target image' is typically a complex wavefront in some 2D region of space. It is described simply by a matrix of complex numbers representing the amplitude and phase of the wavefront at sample points. When this wavefront propagates through space and is detected by a viewer's eyes, a 3D image is perceived as though the wavefront had originated from a real 3D object. This target image may be determined from the replay of a CGH designed by the CRT, Ping-pong or DS algorithms.

For a display system based on a CGH, the complexity of the SLM, in terms of the number of pixels required, is determined both by the required image size and angle of view (the angle over which the 3D image can be seen by a viewer). Particularly for multi-viewer systems, which tend to need large viewing angles, this results in a need for a large numbers of pixels (e.g. $10^{10}$ pixels for a workstation application). Even for extremely powerful computers, the complete computation process, that may include ray tracing and binarisation with POCS, can take many hours. Such mechanisms are not suitable for practical real time or near real time applications.

Attempts have been made to break the CGH computation process into smaller blocks to make the problem more tractable. These involve calculating a number of small sub-holograms or sub-CGHs which are then "stitched" together to form the final desired large CGH. For example, the article "Iterative interlacing approach for synthesis of computer generated holograms", O. K Ersoy, J. Y. Zhuang & J. Brede, Applied Optics, Vol. 31 No. 32, November 1992, describes a process in which a first sub-hologram is designed which provides a noisy image. Further sub-holograms are added which successively reduce noise. This process however requires sequential processing of the sub-holograms and is not suited to parallel processing. Other approaches are described in "Fast decimation in frequency direct binary search algorithms for synthesis of computer generated holograms", J-K. Zhuang & O. K. Ersoy, J. Opt. Soc. Am. A, Vol. 11, No. 1, January 1994; "Optimal decimation in frequency iterative interlacing technique for synthesis of computer generated holograms", J-Y. Zhuang & O. K. Ersoy, J. Opt. Soc. Am. A, Vol. 12 No. 7, July 1995; and "Error reduction of quantised kinoforms by means of increasing the kinoform size", S. Yang & T. Shimomura, Applied Optics, Vol. 37 No. 29, October 1998.

There remains a need for a method of generating binary CGHs which allows CGHs to be generated in real time or near real time. The present invention aims to satisfy this need based upon the recognition that the information in a hologram is contained in the slope or gradient of the hologram fringes, the fringes being proportional to the interference pattern which the hologram records.

SUMMARY OF THE INVENTION

According to a first aspect of the present invention there is provided a method of generating a binary computer generated hologram for use in displaying a holographic image, the method comprising the steps of:

generating a complex modulation computer generated hologram corresponding to a desired replay object;

transforming the complex modulation computer generated hologram into a real positive computer generated hologram; and transforming the real positive computer generated hologram into a binary computer generated hologram by comparing each element of the real positive computer generated hologram with at least one neighbouring element and replacing the compared element with a binary value which depends upon the result of the comparison.

Embodiments of the invention are capable of generating binary CGHs in times which are substantially shorter than the times taken by conventional methods to generate equivalent CGHs. The binary CGHs generated by these embodiments are at least equivalent in quality to those generated by conventional methods.

The step of transforming the complex modulation computer generated hologram into a real positive computer generated hologram may comprise replacing each complex element of the CGH with its real part. Alternatively, each complex element may be replaced with only the complex part, or with the absolute value or argument of the complex element, or a method involving modulation of the complex CGH with a cosinusoidal carrier frequency may be used.

The step of comparing each element of the real positive computer generated hologram with at least one neighbouring element and replacing the compared element with a binary value which depends upon the result of the comparison, preferably comprises determining whether an element is greater than or less than the neighbouring element. In the event that the element is greater than the neighbouring element, the element is replaced with the binary value 1, otherwise it is replaced with the binary value 0.

Preferably, said step of generating a first complex modulation computer generated hologram corresponding to a desired replay object comprises defining a signal plane and placing a region of interest containing the desired replay object within the signal plane, on one side of a line of symmetry of the signal plane. Comparisons between elements are made in directions parallel to the line of symmetry in the signal plane. That is to say that an element is compared with a neighbouring element lying in the same, parallel direction.

In certain embodiments of the present invention, the complex modulation computer generated hologram may be sub-divided into a plurality of sub-holograms, with each complex modulation sub-hologram being transformed into a real positive computer generated sub-hologram. Each real positive computer generated sub-hologram is then transformed into a binary computer generated sub-hologram. By processing each of the sub-holograms in parallel, the CGH generation process can be accelerated considerably.

It will be appreciated that the data for the desired replay object may be obtained from a real object, captured for example using a digital imaging system, or it may be simulated, generated for example using a computer aided design process.

The step of generating a complex modulation computer generated hologram corresponding to the replay object may comprise using the CRT, DS or ping-pong algorithm to produce a full complex modulation or grey scale amplitude modulation computer generated hologram. Where an object can be described by a mathematically, a complex modulation computer generated hologram may be obtained by applying a Fourier transform to the mathematical description.

According to a second aspect of the present invention there is provided an electronic storage medium having stored thereon a computer generated hologram computed using the method of the first aspect of the present invention.

According to a third aspect of the present invention there is provided an electronic storage medium having stored thereon a program for causing a computer to:

generate a complex modulation computer generated hologram corresponding to a desired replay object;

transform the complex modulation computer generated hologram into a real positive computer generated hologram; and transform the real positive computer generated hologram into a binary computer generated hologram by comparing each element of the real positive computer generated hologram with at least one neighbouring element and replacing the compared element with a binary value which depends upon the result of the comparison.

DESCRIPTION OF THE FIGURES

For a better understanding of the present invention and in order to show how the same may be carried into effect reference will now be made, by way of example, the accompanying drawings, in which.

DESCRIPTION OF A PREFERRED EMBODIMENT

Figure 1:
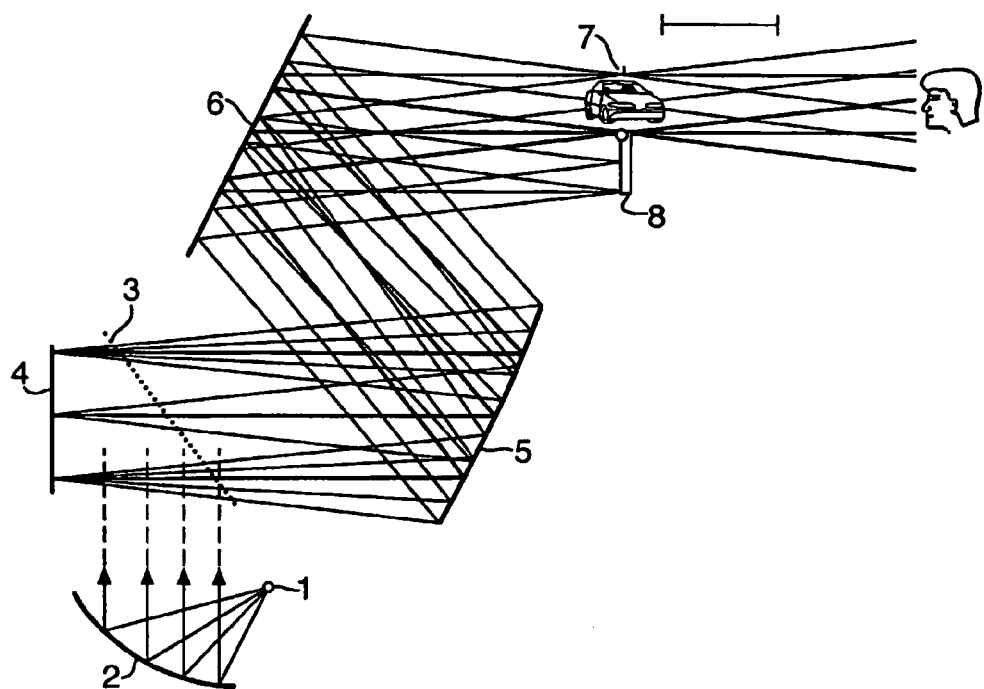
FIG. 1 illustrates schematically a simplified holographic display.

A display for displaying a holographic image using a computer generated hologram (CGH) has been described with reference to FIG. 1. There will now be described a method of generating a CGH for use with such a display (or other types of holographic display).

Figure 2:
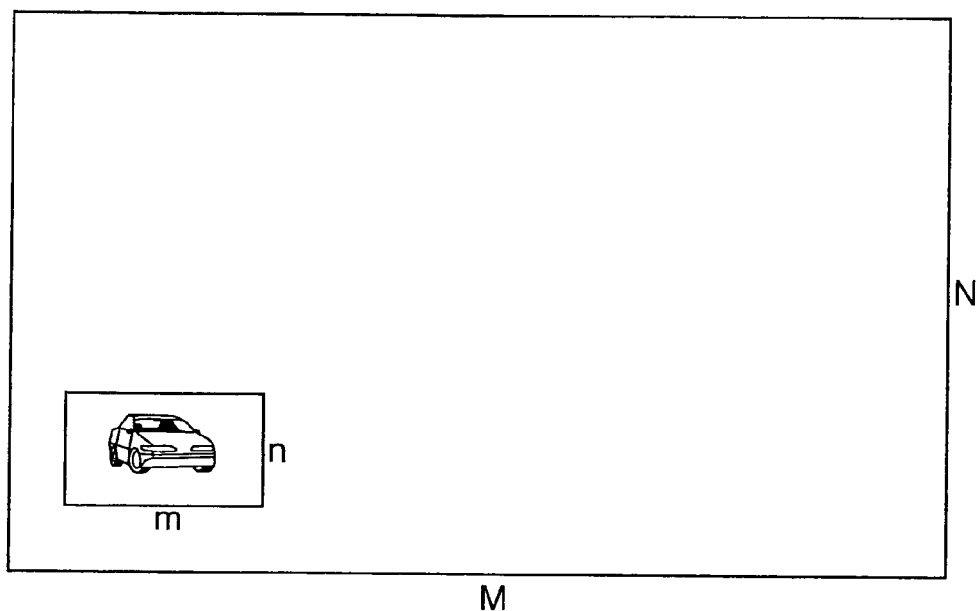
FIG. 2 illustrates a desired 2D replay object located within a signal plane.

As illustrated in FIG. 2, the starting point for the CGH generation process is a desired replay object for which it is desired to generate the CGH. For reasons of simplicity and to more clearly illustrate the CGH computation process, the replay object illustrated in FIG. 2 is a 2D object. The replay object is located within a region of interest (ROI), having a size n×m pixels, which is in turn located within a signal plane having a size N×M pixels. In this example, the ROI is surrounded by a zero padded area within the signal plane. This is done in anticipation that an empty region is going to be required to locate 'binarisation noise'. Typically this object is a simulated object held in the memory of a computer. For example, the object may be a car designed using a CAD application. The 3D spatial co-ordinates of the object are known.

Using a method such as CRT (Cameron C D, Pain D A, Slinger C W, "Computational challenges of emerging novel true 3D holographic displays", SPIE Vol. 4109. August 2000) or the ping-pong method (Ichioka Y, Izumi M, Suzuki Y, "Scanning halftone plotter and computer-generated continuous tone hologram", Appl. Opt. 10, 403–11, 1971), a "perfect" CGH is generated which may be a full complex modulation or at least grey scale amplitude modulation. Each element in the CGH array comprises a real and imaginary component (or amplitude and phase component). If it were possible to provide a complex modulation or grey scale amplitude SLM then this CGH could of course be used directly to display the target image. However, in practice it is very desirable to be able to use binary SLMs. The CGH must therefore be binarised (i.e. each element converted to a binary on/off value).

As explained above, a first step in this process is to replace each complex element of the CGH with a real positive value. It has been found that the best approach is to merely replace each complex element with the real part of the element, discarding the imaginary part. However, other approaches my provide satisfactory results. Once the real positive CGH array has been generated, the binarisation process can proceed.

The information stored in a hologram is contained in the slopes (gradients) of the fringes which are proportional to the interference pattern which the hologram records. For a binary CGH, this information is actually stored in the phase transitions between neighbouring elements rather than in the element transmission values themselves. Hence, in binarising a CGH it is important to retain as much as possible the gradient distribution of the fringe pattern—the actual transmission values are unimportant.

Binarisation is carried out by comparing each element of the real positive CGH with a neighbouring element. For example, if $CGH_{x,y}$ is an element of the real positive CGH array located at position x,y IF $CGH_{x,y} > CGH_{x,y+1}$ then $CGH_{x,y}=1$, ELSE $CGH_{x,y}=0$.

A by-product of calculating the gradient can be the appearance of a dark band across the replay plane. This arises because the operation of comparing neighbouring nodes is equivalent to the shifting of the signal spectrum array by one pixel in a given direction and the subtraction of this array from the original array. Shifting the spectrum array by one pixel introduces a phase shift which means that the image in the replay will have a linear blazed phase across it. Subtracting the (real) image from the image having the blazed phase across it means that different parts of the result will be in or out of phase, equivalent to a sinusoidal modulation being encoded into the CGH and hence a dark band appearing in the replay plane. A dark band appearing in the replay image may degrade the quality of the replay image.

Figure 3:
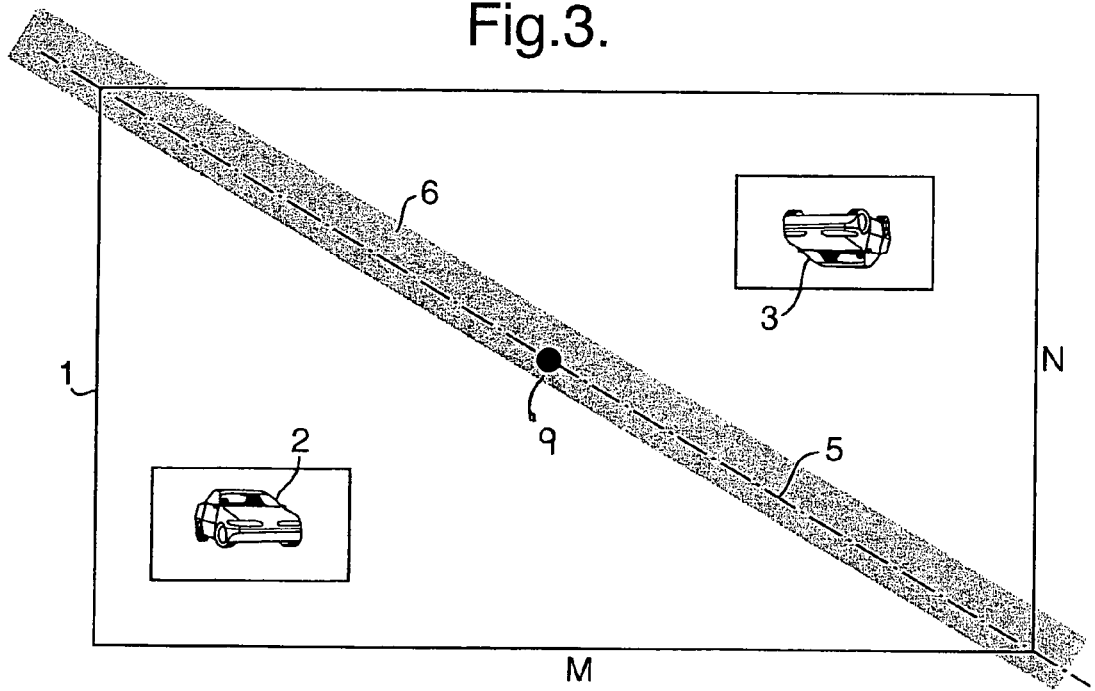
FIG. 3 illustrates the 2D replay object of FIG. 2 located within a replay plane.

In order to mitigate the effects of this problem it is necessary to choose carefully the direction in which element comparisons are carried out so that the dark band does not overlap with the ROI. The 'preferred direction is parallel to a line of symmetry in the replay plane. With reference to FIG. 3, there is illustrated the replay plane 1 containing the first order replay 2, a complex conjugate of first order 3, and a dc spot 9. A line of symmetry 5 can be identified extending from the top left hand corner as viewed in the FIG., to the bottom right hand corner. The process of binarisation commences for example at the element at the bottom left corner of the real positive CGH array. As this element has no neighbour in the direction parallel to the line of symmetry it is compared to the element at the top right corner (this arises as a Fourier transform assumes that the CGH structure is periodic, with the CGH being repeated at each edge). The element is replaced with a binary value dependent upon the result (as described above). The process continues, proceeding along lines parallel to the line of symmetry 5, until finally the element at the top right corner has been binarised. As with the first element, elements at the end of a processed line of elements are compared with elements at the same point on the opposite edge of the CGH. The result of processing the CGH in this way is that the dark band 6 appears parallel to the line of symmetry 5 in the replay plane 1, and does not overlap with the replay image 2. By viewing the replay plane through an appropriately sized viewer, the conjugate image and the dark band, as well as the dc spot, can be blocked without interfering with the ROI.

Figure 4:
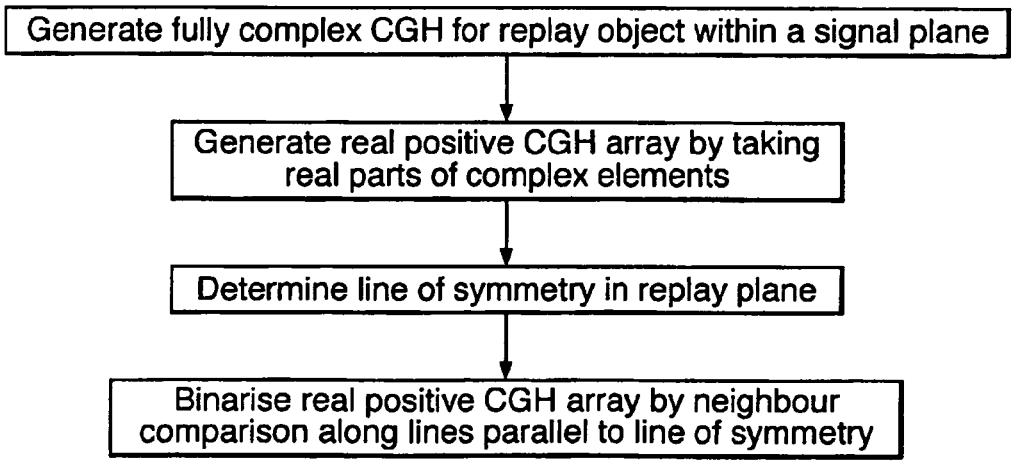
FIG. 4 is a flow diagram illustrating a method of generating a binary CGH for display with the display of FIG. 1.

The method described above is referred to as Gradient Matching or GRAM and is further illustrated by the flow diagram of FIG. 4. It is noted that as GRAM operates on a fringe pattern determined by any method, it ignores any ROI which was considered during the calculation of the target signal's spectrum. In addition to the increased processing speed, GRAM therefore has an important advantage over the other direct encoding method known as error diffusion, as error diffusion needs to know where the ROI is located within the replay plane in order to design the optimum diffusion weights. The GRAM replay tends to be brighter and less noisy than the equivalent replay resulting from error diffusion.

It will be appreciated by the person of skill in the art that various modifications may be made to the above described embodiment without departing from the scope of the present invention.

The invention claimed is:

1. A method of generating a binary computer generated hologram for use in displaying a holographic image, the method comprising the steps of:
    generating a complex modulation computer generated hologram corresponding to a desired replay object;
    transforming the real positive computer generated hologram into a complex modulation computer generated hologram; and
    transforming the real positive computer generated hologram into a binary computer generated hologram by comparing each element of the real positive computer generated hologram with at least one neighbouring element and replacing the compared element with a binary value which depends upon the result of the comparison.

2. A method according to claim 1, wherein the step of transforming the complex modulation computer generated hologram into a real positive computer generated hologram comprises replacing each complex element of the computer generated hologram with its real part.

3. A method according to claim 1, wherein the step of comparing each element of the real positive computer generated hologram with at least one neighbouring element and replacing the compared element with a binary value which depends upon the result of the comparison, comprises determining whether an element is greater than or less than the neighbouring element and, in the event that the element is greater than the neighbouring element, the element is replaced with the binary value 1, otherwise it is replaced with the binary value 0.

4. A method according to claim 1, wherein said step of generating a first complex modulation computer generated hologram corresponding to a desired replay object comprises defining a signal plane and placing a region of interest containing the desired replay object within the signal plane, on one side of a line of symmetry of the signal plane, with comparisons between elements being made in directions parallel to the line of symmetry in the signal plane.

5. A method according to claim 4, wherein said line of symmetry is a straight line extending from a first to a second corner of the signal plane.

6. An electronic storage medium having stored thereon a computer generated hologram computed using the method of claim 1.

7. An electronic storage medium having stored thereon a program for causing a computer to:
generate a complex modulation computer generated hologram corresponding to a desired replay object;
transform the complex modulation computer generated hologram into a real positive computer generated hologram; and
transform the real positive computer generated hologram into a binary computer generated hologram by comparing each element of the real positive computer generated hologram with at least one neighbouring element and replacing the compared element with a binary value which depends upon the result of the comparison.

* * * * *

UNITED STATES PATENT AND TRADEMARK OFFICE
CERTIFICATE OF CORRECTION

PATENT NO. : 7,161,721 B2 Page 1 of 1
APPLICATION NO. : 10/504205
DATED : January 9, 2007
INVENTOR(S) : Robert Ian Young It is certified that error appears in the above-identified patent and that said Letters Patent is hereby corrected as shown below:

Column 6, line 37, claim 1 should read:

1. A method of generating a binary computer generated hologram for use in displaying a holographic image, the method comprising the steps of:
    generating a complex modulation computer generated hologram corresponding to a desired replay object;
        transforming the ~~real positive~~ complex modulation computer generated hologram into a ~~complex modulation~~ real positive computer generated hologram; and
    transforming the real positive computer generated hologram into a binary computer generated hologram by comparing each element of the real positive computer generated hologram with at least one neighbouring element and replacing the compared element with a binary value which depends upon the result of the comparison.

Signed and Sealed this

Fifth Day of May, 2009

JOHN DOLL
*Acting Director of the United States Patent and Trademark Office*